United States Patent [19]
Ericksson

[11] Patent Number: 5,975,168
[45] Date of Patent: Nov. 2, 1999

[54] DEVICE AND METHOD FOR TRIMMING A TREE

[75] Inventor: Jan A. Ericksson, Osterfarnebo, Sweden

[73] Assignee: Caterpillar Commercial SARL, Geneva, Switzerland

[21] Appl. No.: 09/152,167

[22] Filed: Sep. 11, 1998

[51] Int. Cl.⁶ .................................. B27L 1/00; B27B 1/00
[52] U.S. Cl. .................. 144/343; 144/24.13; 144/208.2; 144/248.5; 144/357
[58] Field of Search ................................ 144/4.1, 24.13, 144/335, 338, 343, 208.2, 246.1, 250.76, 248.5, 356, 357

[56] References Cited

U.S. PATENT DOCUMENTS

| | | | |
|---|---|---|---|
| 4,194,542 | 3/1980 | Ericksson | 144/24.13 |
| 4,515,192 | 5/1985 | Ericksson | 144/343 |
| 4,922,976 | 5/1990 | Hacker | 144/343 |
| 4,974,648 | 12/1990 | Propst | 144/343 |
| 5,058,638 | 10/1991 | Hacker et al. | 144/343 |
| 5,219,010 | 6/1993 | Ericksson | 144/24.13 |

FOREIGN PATENT DOCUMENTS

| | | | |
|---|---|---|---|
| 94227 | 4/1995 | Finland | B27L 1/02 |

*Primary Examiner*—W. Donald Bray
*Attorney, Agent, or Firm*—Alan J. Hickman

[57] ABSTRACT

A trimming device and method maintains a first trimming member of a tree harvester head at a preselected transverse position relative to a tree trunk during relative longitudinal movement of the tree trunk. A first control device having a tree trunk engaging portion movably connected to the first trimming member selectively establishes the relative transverse position of the first trimming member and the tree trunk. An actuator urges the tree trunk engaging portion into engagement with the tree trunk and the first trimming member at the preselected transverse position.

25 Claims, 4 Drawing Sheets

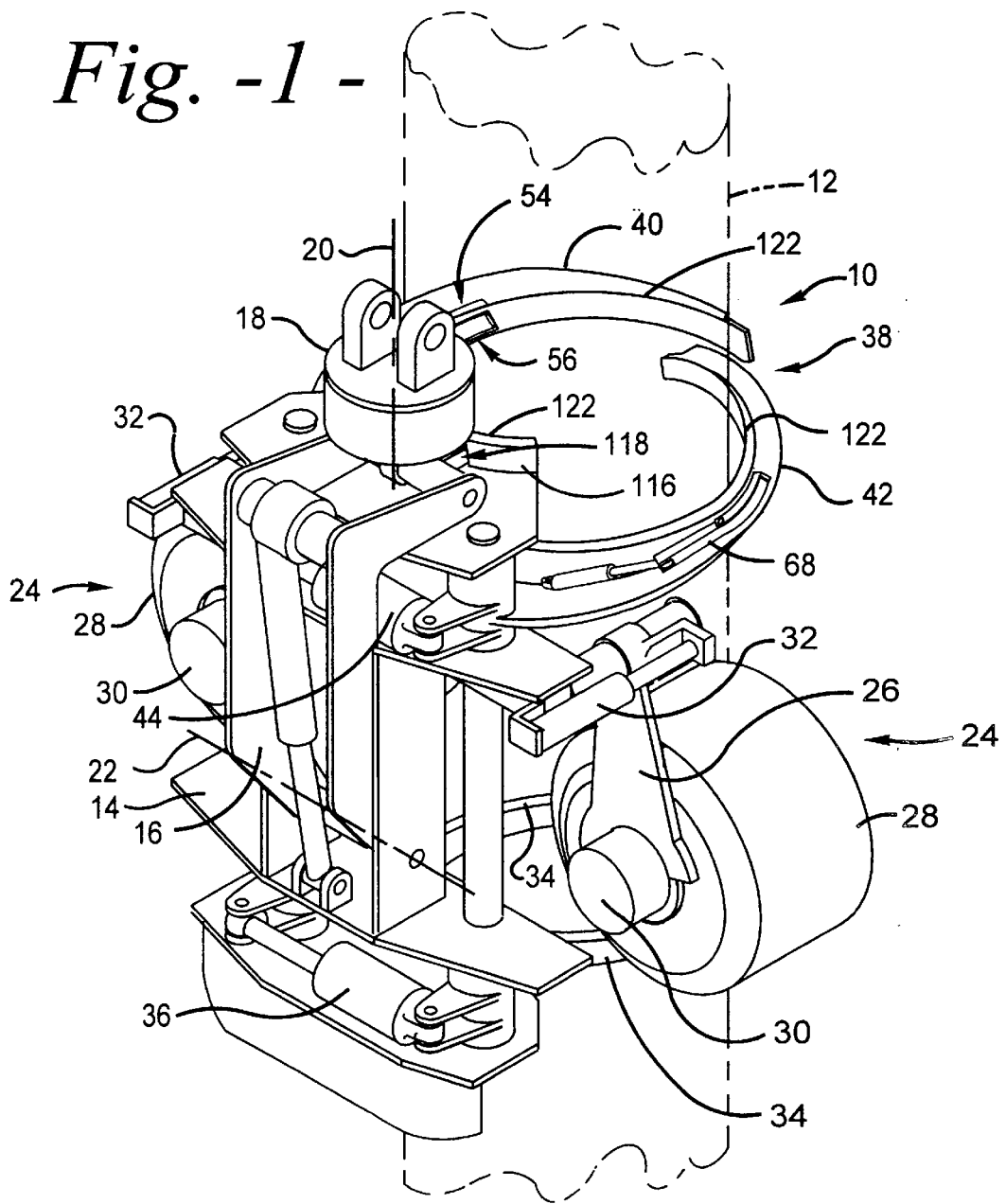
Fig. -1 -

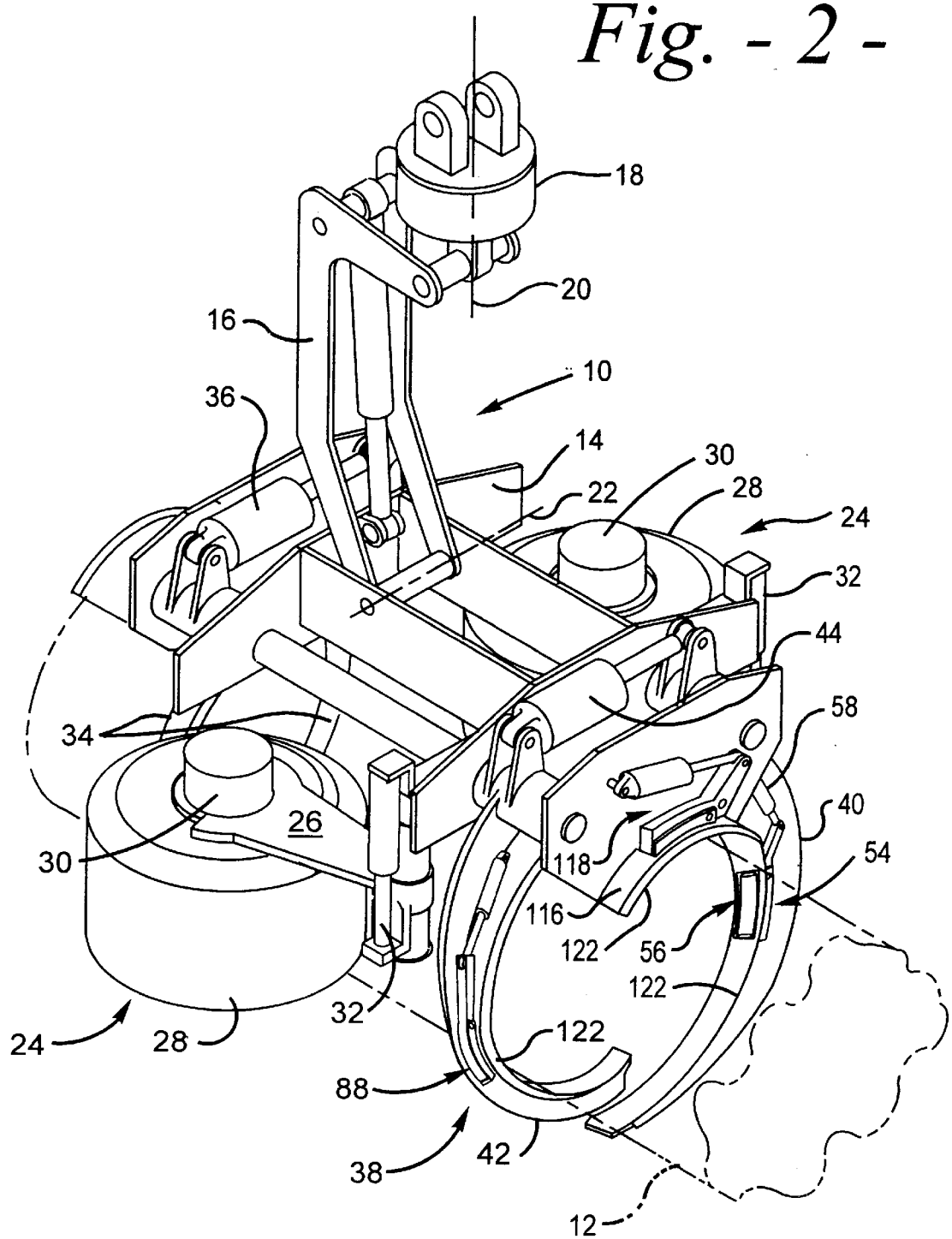
Fig. -2-

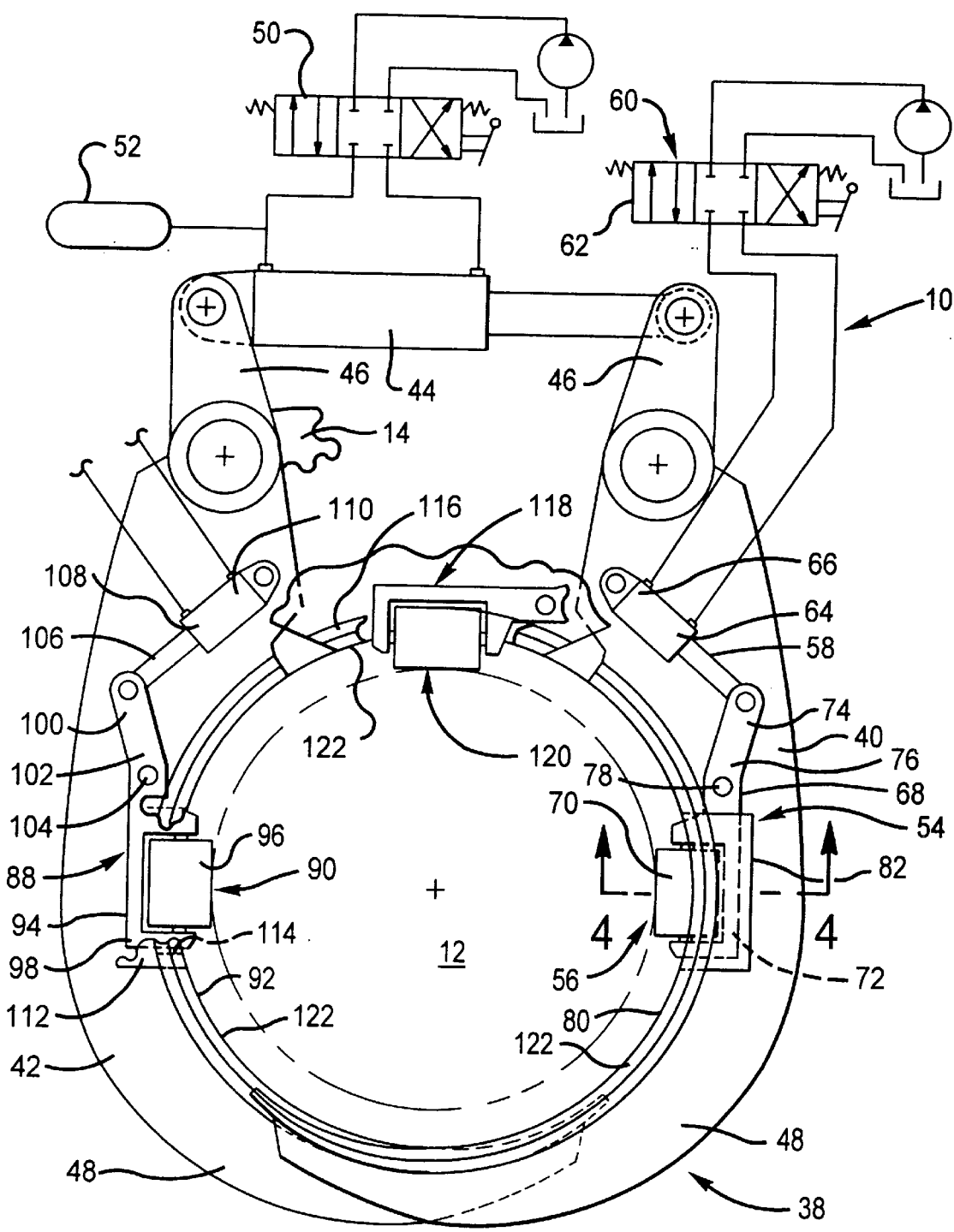
Fig. - 3 -

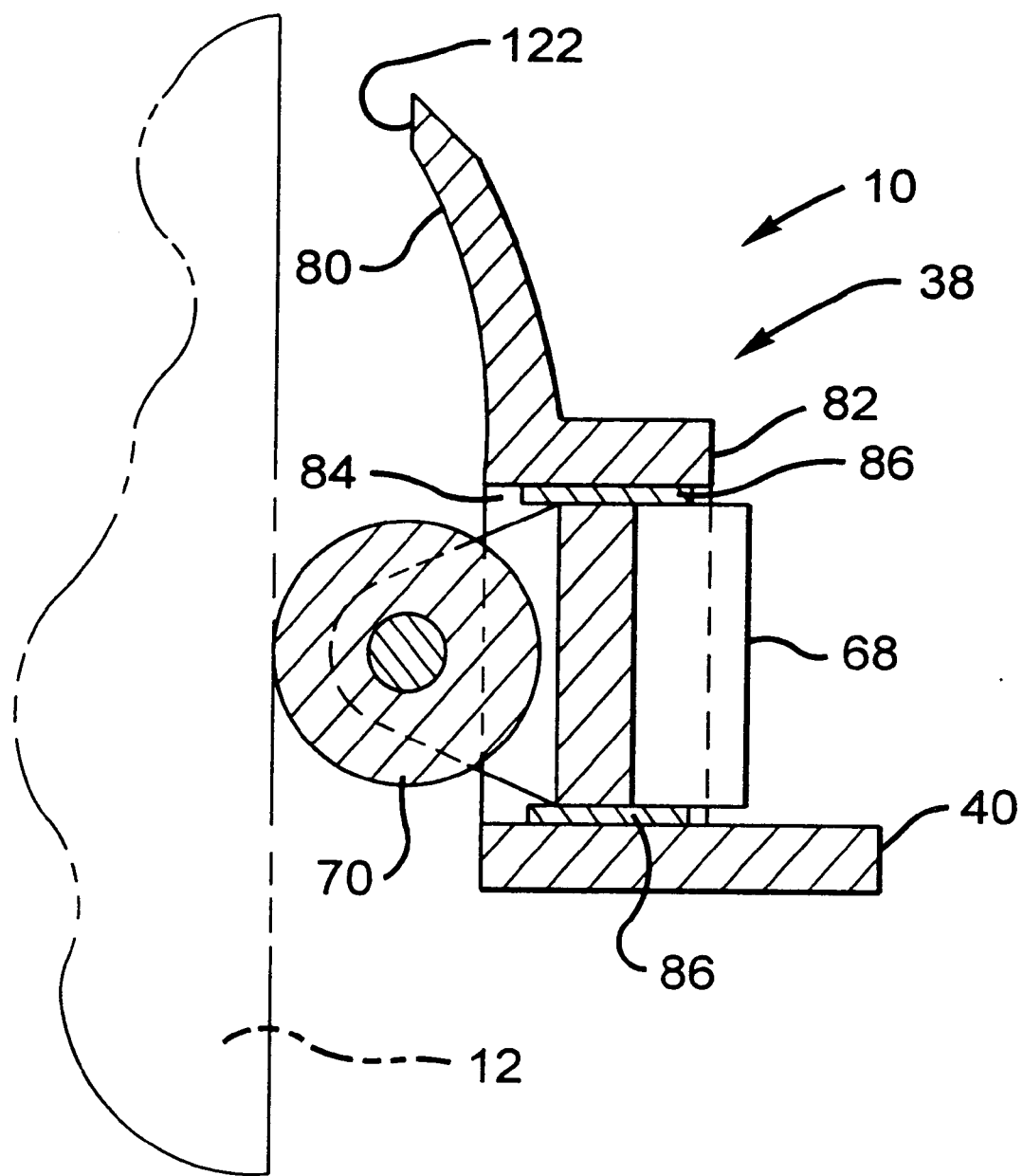
Fig. - 4 -

DEVICE AND METHOD FOR TRIMMING A TREE

TECHNICAL FIELD

This invention relates to a tree trimming device and method and more particularly to a tree trimming device and method having a control device defining a transverse position of a tree trimming member relative to a trunk of the tree.

BACKGROUND ART

Tree trimming devices have been known to delimb and debark a tree. Such trimming devices have been provided with a harvester head of the type used with a tree harvesting machine. Some tree trimming devices have tree trimming members that are pivotally connected to a frame of the harvesting head. Such harvester heads have a driving device that provides relative movement between the tree and the trimming members. Such trimming devices have been known to have a knife edge or debarking device which provides delimbing or debarking functions.

The tree trimming members are pivotally movable into position about the trunk of the tree being trimmed. At this position it is assumed that the trimming members are adequately pressed against the circumference of the tree trunk and in position to trim the tree. However, due to the various different types of trees being trimmed and variations in the tree diameter and size, the position of the trimming members relative to the tree trunk may not be or may not remain in the desired transverse position relative to the tree trunk as the tree trunk is longitudinally moved relative to the tree trimming members. As a result, poor quality delimbing or debarking occurs. This may result in a loss of the wood product and a need for further time consuming processing.

The present invention is directed to overcoming one or more of the problems as set forth above.

DISCLOSURE OF THE INVENTION

A trimming device for a tree harvesting head having a frame and a driving device connected to the frame and moveable to translate a tree trunk longitudinally relative to the frame is provided. The term trimming, in the context of this invention, includes tree trunk stripping functions such as delimbing and debarking. The trimming device has a first trimming member connected to and movable relative to the frame and an actuator connected to the first trimming member and selectively actuatable to move the first trimming member relative to the tree trunk. A first control device having a tree trunk engaging portion is movably connected to the first trimming member. The tree trunk engaging portion is selectively moveable relative to the first trimming member and adapted to maintain the first trimming member at a preselected position relative to the tree trunk during relative longitudinal translation of the tree trunk.

A method of trimming a tree with a harvesting head having a frame, a first trimming member pivotally connected to the frame and a first control device movably connected to the first trimming member, comprises the steps of positioning the frame of the harvesting head adjacent the tree, moving the first trimming member relative to the frame and transversely relative to the tree to a position at which a tree trunk engaging portion of the first control device is engaged with a trunk of the tree, and moving a one of the tree and harvesting head relative to an other of the tree and harvesting head and trimming the tree with the first trimming member.

BRIEF DESCRIPTION OF THE DRAWINGS

FIG. 1 is a diagrammatic isometric view showing a tree harvesting head positioned in an upright tree trunk grabbing position;

FIG. 2 is a diagrammatic isometric view of the tree harvesting head of FIG. 1 shown pivoted to a tree processing position;

FIG. 3 is a diagrammatic top end view of the tree harvesting position of FIG. 1 with portions broken away showing control devices associated with the trimming members; and FIG. 4 is a diagrammatic cross-sectional view taken along lines 4—4 of FIG. 3.

BEST MODE FOR CARRYING OUT THE INVENTION

With reference to the drawings, a tree harvesting head 10 for use on a tree harvesting machine, for example, of the type having a plurality of ground engaging wheels and a prime mover for propelling the harvesting machine over the underlying terrain in a conventional manner (all not shown) is provided. The tree harvesting head 10 is universally and pivotally movably connected to a boom (not shown) pivotally connected to the harvesting machine in a conventional manner. The tree harvesting head 10 is movably and selectively positionable relative to a tree 12 to be harvested in a conventional manner.

The tree harvesting head 10 has a frame 14 and a connecting frame 16. The connecting frame 16 is connected to the boom by a universal joint (not shown) and a rotator 18 having an axis of rotation 20. The universal joint allows for universal free movement of the connecting frame 16 and the rotator 18 provides powered rotation of the connecting frame 16 about the rotator axis 20. This provides the tree harvesting machine operator with harvesting head positioning capabilities relative to the tree 12 to be harvested.

The frame 14 is pivotally connected to the connecting frame 16 and pivotally movable about a first axis 22 which is transverse the rotator axis 20. A pair of driving devices 24 each having an arm 26, a driving wheel 28 and a motor 30 drivingly connected to the driving wheel 28 is provided. The arms 26 are movably connected to the frame 14 and pivotal to engage the driving wheels 28 with the trunk of the tree 12 being harvested. The driving wheels 28 engage a tree trunk 12 on opposite sides of the tree trunk 12 and longitudinally move the tree trunk 12 relative to the frame 14. The motors 30, preferably hydraulic motors 30, provide controlled rotation of the wheels 28 and the longitudinal movement of the tree trunk 12. The arms 26 are each connected to a fluid operated actuator 32 and selectively movable thereby between a tree engaging position of the driving wheel and a tree receiving position of the driving wheel spaced from the tree engaging position of the driving wheel. Such driving devices are known in the art and will therefore not be discussed in any greater detail.

A pair of clamp arms 34 are pivotally connected to the frame 14 and are movable between a tree receiving position and a tree holding position. The clamp arms 34 are curved, spaced on the frame 14 from the driving devices 24 and hold the tree trunk 12 relative to the frame 14. A fluid operated actuator 36 is pivotally connected to and between the clamp arms 34 to effect selective pivotal movement of the clamp arms 34. Since clamp arms 34 of this type are well known in the art further discussion will be omitted.

A cutoff saw (not shown), for example, a chain saw is pivotally connected to the frame 14 and selectively actuatable to cut the tree trunk 12 off at its base. The cutoff saw is also operative to cut the tree trunk 12 into desired log lengths. Cutoff saws suitable for this application are well known to those skilled in the art and therefore will not be discussed in any greater detail.

As best seen in FIG. 3, a trimming device 38 has first and second trimming members 40,42 pivotally connected to the frame 12 at locations spaced longitudinally (as in the longitudinal direction of the tree trunk 12 being held by the clamp arms 34) from the driving devices 24 and the clamp arms 34 and spaced apart from each other so as to accommodate the tree trunk 12 therebetween. The first and second trimming members 40,42 are movable relative to the frame 14 between a tree trunk receiving position and a tree trunk trimming position. In particular, the trimming members 40,42 and driving devices 24 are located longitudinally (as in the longitudinal direction of the tree trunk 12 held therebetween) between the first and second trimming members 40,42 and the pair of clamp arms 34.

An actuator 44 is pivotally connected to and between the first and second trimming members 40,42. The actuator 44 is preferably of the linear fluid operated type, however, other actuators, for example, electrical and mechanical actuators are considered equivalents and within the spirit of the invention. Specifically, the actuator 44 is pivotally connected at a first end portion 46 of the first and second trimming members 40,42 in a conventional manner, such as by a pivot pin, and the first and second trimming members 40,42 are pivotally connected to the frame 14 at a location between the first end portion 46 and a second end portion 48 thereof. The actuator 44 is controllably and selectively actuatable to move the first and second trimming members 40,42 between the tree trunk receiving trimming positions. A control valve 50 is connected to the actuator 44 and adapted to selectively deliver fluid flow to the actuator 44 for extension and retraction purposes. An accumulator 52 or equivalent device is connected to the actuator 44 and biases the actuator 44 to extend. The accumulator 52 urges the first and second trimming members 40,42 toward a tree trunk 12 engaging position.

A first control device 54 having a tree trunk engaging portion 56 is movably connected to the first trimming member 40. The tree trunk engaging portion 56 is selectively movable relative to the first trimming member 40 and adapted to establish a preselected position of the first trimming member 40 relative to the tree trunk 12 during longitudinal translation of the tree trunk 12. The tree trunk engaging portion 56 engages the tree trunk 12 and establishes a preselected transverse position of the first trimming member 40 relative to the tree trunk 12.

The first control device 54 includes a first actuator 58 connected to the tree trunk engaging portion 56 and a controller 60 connected to the first actuator 58. The first actuator 58 is selectively movable to selectively position the tree trunk engaging portion 56 relative to the first trimming member 40.

The first actuator 58 is preferably a linear fluid operated actuator and the controller 60 is a fluid control valve 62 connected to the first actuator 58 and adapted to selectively controllably direct fluid flow to the first actuator 58. The first actuator 58 has a rod end 64 and a head end 66 and the fluid control valve 62 is adapted to selectively direct pressurized fluid flow to a selected one of the rod and head ends 64,66 and thereby retract and extend the fluid operated actuator 58. The rod and head ends 64, 66 are connected to and in fluid communication with the fluid control valve 62. This extension and retraction pivotally moves a carrier 68 hereinafter discussed.

The tree trunk engaging portion includes a roller 70 and a carrier member 68 which is elongated. The carrier 68 has first and second spaced end portions 72, 74 and a middle portion 76 located between the first and second end portions 72,74. The middle portion 76 is pivotally connected to the first trimming member 40 by a pivot pin 78 and the roller 70 is rotatively connected to the carrier first end portion 72. The first actuator 58 is pivotally connected to and between the carrier second end portion 74 and the trimming member 40.

As best seen in FIG. 4, the first trimming member 40 has a tree trunk facing side portion 80. A guide member 82 having side wall portions defining a guideway 84 is connected to the first trimming member 40. The guideway 84 is open at the tree trunk facing side portion 80 and the roller 70 is disposed in and movable in the guideway 84 in a passing relationship relative to the tree trunk facing side portion 80 in response to pivotal movement of the carrier 68.

A guide bearing member 86 is disposed in the guideway 84 and engageable to guide the carrier member 68 relative to the guideway 84. The guide bearing member 86, which is made of any suitable metallic or non-metallic bearing material, is connected to the carrier member 68 and engageable with the guide way 84. It is to be noted that the guide bearing member 82 may be connected in the guideway 84 to the guide member 82 and engageable with the carrier member 68 without departing from the spirit of the invention.

The second trimming member 42 is pivotally connected to the frame 14, in a manner like that of the first trimming member 40, and pivotally movable relative to the frame 14 between spaced apart tree trunk receiving and trimming positions. The second trimming member 42 is spaced from and faces the first trimming member 40. The first and second trimming members 40, 42 act together to hold the tree trunk 12 therebetween and to trim the tree 12. It should be noted that the second trimming member 42 may be connected rigidly to the frame 14 without departing from the spirit of the invention.

A second control device 88 has a tree trunk engaging portion 90 which is movably connected to the second trimming member 42. The tree trunk engaging portion 90 is selectively movable to a preselected position relative to the second trimming member 42. The tree trunk engaging portion 90 is engageable with the tree trunk 12 and establishes a preselected transverse position of the second trimming member transversely relative to the tree trunk 12 being trimmed.

The second trimming member 42 has a tree trunk facing side portion 92. The tree trunk facing side portions 80, 92 of the first and second trimming members 40, 42 face each other and a tree positioned between the first and second trimming members 40, 42.

The tree trunk engaging portion 90 of the second control device 88 has a carrier 94 and a roller 96 rotatably connected to the carrier 94. The carrier 94 is pivotally connected to the second trimming member 42. Specifically, the carrier 94 is elongated, has first and second spaced end portions 98,100 and a middle portion 102 located between the first and second end portions 98,100. The middle portion 102 is pivotally connected to the second trimming member 42 by a pivot pin 104 and the roller 96 is rotatively connected to the carrier 94 first end portion 98.

A second actuator 106 is pivotally connected to the tree trunk engaging portion 90 of the second control device 88 and is selectively actuatable to move the tree trunk engaging portion 90 of the second control device 88 to the preselected position. Specifically, the second actuator 106 is pivotally connected to and between the carrier second end portion 100 and the second trimming member 42. The roller 96 of the second control device 88 is movable in a passing relationship relative to the tree trunk facing side portion 92 of the second trimming member 42 in response to actuation of the second actuator 106.

The second actuator 106 is preferably a linear fluid operated actuator and a controller (not shown), of the second control device 88, like that of the first controller 60, includes a fluid control valve connected to the second actuator 106 and adapted to selectively direct fluid flow to the second actuator 106. The second actuator 106 has a rod end 108 and a head end 110 and the fluid control valve is adapted to selectively direct pressurized fluid flow to a selected one of the rod and head ends 108,110 and thereby retract and extend the second actuator 106. The fluid control valve of the second control device 88 is connected to and selectively in fluid communication with the rod and head ends 108, 110. This extension and retraction pivotally moves the carrier 94.

The second control device 88, like the first control device 54, has a guide member 112 with a guideway 114 disposed therein. The guide member 112 of the second control device 88 is connected to the second trimming member 42 and the guideway 114 thereof opens at the tree trunk facing side portion 92 of the second trimming member 42. The carrier member 94 of the second control device 88 is slidably guidably movable in the guideway 114 of the guide member 112 in response to pivotal movement of the carrier member 94. The rollers 90,96 of the first and second control devices 54,88 move within the guideways 84, 114, respectively, and extend from the guideways 84, 114, respectively. The rollers 70, 96 are engageable with the tree trunk 12 being trimmed on substantially diametrically opposite sides of the tree trunk 12.

A guide bearing member, not shown, but like the guide bearing member 86 of the first control device 54, is disposed in the guideway 114 of the second control device and engageable to guide the carrier member 94 relative to the guideway 114. The guide bearing member of the second control device 88, is made of any suitable metallic or non metallic bearing material, is connected to the carrier member 94 and engageable with the guideway 114 of the second control device 88. It is to be noted that the guide bearing member of the second control device 88 may be connected to the guide member 112 of the second control device 88 and engageable with the carrier 94 of the second control device 88 without departing from the spirit of the invention.

A third trimming member 116 is rigidly connected to the frame 14 at a location, circumferentially spaced relative to the tree trunk 12, between the first and second trimming members 40, 42. The third trimming member 116 serves as a butt plate and further positions the tree trunk 12 being trimmed. A third control device 118 of identical construction to that of the first and second control devices 54, 88 may be connected to the third trimming member 116 for the identical purpose of maintaining the tree trunk 12 being trimmed at a preselected transverse position relative to the third trimming member 116. Like the first and second control devices 54, 88, the third control device 118 has a tree trunk engaging portion 120 that is pivotally moveably connected to the third trimming member 116 and engageable with the tree trunk 12. Since the third control device 118 is identical to that of the first and second control devices 54, 88, additional discussion will be omitted.

The first, second and third trimming members 40, 42, 116 each have a delimbing knife portion 122 connected thereto. The delimbing knife portions 122 are positioned to engage and delimb the tree 12 during longitudinal translation of the tree trunk 12 relative to the tree harvesting head 10. It should be noted that a debarking device (not shown) may be provided with each of the first, second and third trimming members 40, 42, 116 in addition to or instead of the delimbing knife portions 122 without departing from the spirit of the invention. Debarking devices, for example, rollers with a debarking roller outer surface may be rotatively mounted on the trimming members and engageable with the bark of the tree trunk. Such devices are well known in the art and will not be discussed in any further detail. It is also noted that the previously described harvesting head 10 may be suitable for debarking and trimming purposes without the need for an additional debarking device.

A method of trimming a tree 12 with the harvesting head 10 of this invention includes positioning the frame 14 of the harvesting head 10 adjacent the tree 12 to be harvested, relatively moving the first trimming member 40 transversely relative to the tree 12 to a position at which the tree trunk engaging portion 56 of the first control device 40 is engaged with a trunk of the tree 12, and moving one of the tree 12 and harvesting head 10 relative to an other of the tree 12 and harvesting head 10 and trimming the tree with the first trimming member 40.

The method also includes moving the tree trunk engaging portion 56 of the first control device 54 relative to the first trimming member 40 to a preselected position and thereby control the transverse position of the first trimming member 40 relative to the tree 12.

The method also includes the step of moving the driving device 24 relative to the frame 14 and longitudinally translating the tree trunk 12 relative to the first trimming member 40, and engaging the drive wheels 28 with the tree trunk 12.

The method also includes delivering pressurized fluid to said actuator 44, and maintaining the tree trunk engaging portion 56 of the first control device 54 in engagement with the tree trunk 12.

Industrial Applicability

With reference to the drawings, and in operation, the tree harvesting head 10 is positioned adjacent to the tree 12 to be harvested with the clamp arms 34 and first and second tree trimming members 40, 42 open to receive the tree trunk 12. The clamp arms 34 and the first and second trimming members 40, 42 are then closed to capture and support the tree trunk 12 therebetween. The cutoff saw is then actuated to cut off the tree trunk at the base. The operator of the harvesting machine further manipulates the tree harvesting head 10, the boom and machine to cause the tree to accurately fall under his control.

The felling of the tree 12 includes a pivoting of the frame 14 relative to the connecting frame 16 about the first pivot axis 22 to a transverse position at which the tree trunk 12 is felled and transverse to the axis of rotation 20 of the rotator 18. The driving device 24 is then actuated to relatively longitudinally translate the tree trunk 12. During this longitudinal translation, the trimming and cut to length operation is performed.

The delimbing knife portions 122 of the first, second and third trimming members 40, 42 and 116 engage the limbs of the tree 12 during longitudinal translation of the tree trunk 12 and cut the limbs from the tree trunk 12. Debarking of the tree trunk 12 may also occur during this longitudinal tree translation.

Positioning the delimbing knives 122 transversely (radially) relative to the tree trunk 12. to a tree trunk 12 surrounding position, is achieved by way of an actuator 44 connected to and between the first and second trimming members 40, 42 and by way of the first, second and third control devices 54, 88, 118.

The tree trunk engaging portion 56, 90, 120 of the first, second and third control devices 54, 88, 118 are each selectively moved by way of their associated actuators 58, 106 relative to the first, second and third trimming members 40, 42, 116. In particular, the tree trunk engaging portions 56, 90, 120 are movable in a passing relationship relative to the tree trunk facing side portions 80, 92 of each of the first, second and third trimming members 40, 42, 116. This movement is achieved by operator actuation of the controller 60 which is connected to the actuators 58, 106 of the first second and third control devices 54, 88, 118.

The first, second and third tree engaging portions 56, 90, 120 are positioned by the operator at a preselected desired location relative to the tree trunk facing side portion 80, 92. This position ultimately determines the predetermined transverse positions of the delimbing knife portions 122 relative to the tree trunk 12 because the tree engaging portions 56, 90, 120 are ultimately engaged with the trunk of the tree 12 being harvested.

The first and second trimming members 40, 42 are moved by the actuator 44 to force the tree trunk engaging portions 56, 90, 120 of the first, second and third control devices 54, 88, 118 into engagement with the tree trunk 12. The biasing of the accumulator 52 insures that engagement with the control devices 54, 88, 118 is maintained and thereby the predetermined position of the delimbing knives are maintainable substantially through the full length of travel of the tree trunk.

Other aspects, objects and advantages of this invention can be obtained from a study of the drawings, the disclosure and the appended claims.

I claim:

1. A trimming device for a tree harvesting head having a frame and a driving device connected to the frame and moveable to translate a tree trunk longitudinally relative to the frame; comprising:
   a first trimming member connected to and movable relative to the frame;
   an actuator connected to the first trimming member and being selectively actuatable to move the first trimming member relative to the tree trunk;
   a first control device having a tree trunk engaging portion and being movably connected to the first trimming member, said tree trunk engaging portion being selectively moveable relative to the first trimming member and adapted to maintain the first trimming member at a preselected transverse position relative to the tree trunk during said longitudinal translation of the tree trunk.

2. A trimming device, as set forth in claim 1, wherein said tree trunk engaging portion being engageable with the tree trunk and establishing the preselected transverse position of the first trimming member relative to the tree trunk.

3. A trimming device, as set forth in claim 2, wherein said first trimming member includes a delimbing knife.

4. A trimming device, as set forth in claim 3, wherein said first control device including:
   a first actuator connected to the tree trunk engaging portion; and
   a controller connected to said first actuator and being selectively movable to selectively position the tree trunk engaging portion relative to the first trimming member.

5. A trimming device, as set forth in claim 4, wherein said first actuator being a linear fluid operated jack and said controller being a fluid control valve.

6. A trimming device, as set forth in claim 2, wherein said tree trunk engaging portion includes a tree trunk engaging roller, said first control device including:
   a carrier having first and second end portions and a middle portion located between the first and second end portions, said middle portion being pivotally connected to the first trimming member and said tree trunk engaging roller being rotatively connected to the carrier first end portion; and
   a first actuator connected to and between the second end portion and the first trimming member.

7. A trimming device, as set forth in claim 6, wherein said first actuator being fluid operated, and including a control valve connected to said first actuator and adapted to selectively direct fluid flow to said first actuator.

8. A trimming device, as set forth in claim 7, wherein said first actuator having a rod end and a head end, said fluid control valve being adapted to selectively direct pressurized fluid flow to a selected one of the rod and head ends.

9. A trimming device, as set forth in claim 2, wherein said first trimming member having a tree trunk facing side portion, said tree trunk engaging device including a tree trunk engaging roller, and said first control device including:
   a carrier pivotally connected to said first trimming member, said tree trunk engaging roller being rotatively connected to said carrier; and
   a guide member having a guideway and being connected to said first trimming member, said guideway opening at said tree trunk facing side portion, said roller being disposed and movable in said guideway in a passing relationship relative to the tree trunk facing side portion in response to pivotal movement of said carrier.

10. A trimming device, as set forth in claim 9, including a guide bearing member disposed in the guideway and being engageable to guide the carrier relative to the guideway.

11. A trimming device, as set forth in claim 10, wherein said guide bearing member being connected to the carrier.

12. A trimming device, as set forth in claim 10, wherein said carrier having first and second spaced end portions and a middle portion located between the first and second end portions, said roller being rotatively connected to the first end portion and including:
   a pivot pin pivotally connecting the middle portion of the carrier to the first trimming member; and
   a first actuator pivotally connected to the second end portion of the carrier and the first trimming member.

13. A trimming device, as set forth in claim 12, including a control valve connected to said first actuator and being adapted to deliver pressurized fluid flow to said first actuator, said first actuator pivotally moving said carrier in response to receiving pressurized fluid flow from said control valve.

14. A trimming device, as set forth in claim 3, wherein said actuator biasing said first trimming member toward said tree trunk and maintaining said tree trunk engaging portion in engagement with the tree trunk during relative longitudinal movement of the tree trunk.

15. A trimming device, as set forth in claim 3 including:
   a second trimming member connected to the frame;
   a second control device having a tree trunk engaging portion movably connected to the second trimming member, said tree trunk engaging portion of the second control device being selectively moveable to a preselected position relative to the second trimming member, said tree trunk engaging portion of the second control device being engageable with the tree trunk and establishing a preselected transverse position of the second trimming member relative to the tree trunk being trimmed; and
   a second actuator connected to the tree trunk engaging portion of the second control device and being actuatable to move the tree trunk engaging portion of the second control device to said preselected position.

16. A trimming device, as set forth in claim 15, wherein said first and second trimming members each having a tree trunk facing side portion, and said tree trunk engaging devices of the first and second control devices each including:

a carrier and a roller rotatably connected to the carrier, said carrier of the first control device being pivotally connected to the first trimming member and said carrier of the second control device being pivotally connected to the second trimming member;

said first actuator being pivotally connected to and between the carrier of the first control device and the first trimming member and said second actuator being pivotally connected to and between the carrier of the second control device and the second trimming member;

said roller of the first control device being movable in a passing relationship relative to the tree trunk facing side portion of the first trimming member in response to actuation of the first actuator, and said roller of the second control device being movable in a passing relationship relative to the tree trunk facing side portion of the second trimming member in response to actuation of the second actuator.

17. A trimming device, as set forth in claim 16, wherein said first and second control devices each include a guide member having a guideway disposed therein, said guide member of the first control device being connected to the first trimming member and said guideway thereof opening at the tree trunk facing side portion of the first trimming member, and said guide member of the second control device being connected to the second trimming member and said guideway thereof opening at the tree trunk facing side portion of the second trimming member.

18. A trimming device, as set forth in claim 17, wherein said carrier of the first control device being slidably guidably movable in the guideway of the of the first control device in response to pivotal movement of said carrier of the first control device, and said carrier of the second control device being slidably guidably movable in the guideway of the second control device in response to pivotal movement of the carrier of the second control device.

19. A trimming device, as set forth in claim 16, wherein said rollers of the first and second control devices being adapted to engage the tree trunk being trimmed.

20. A trimming device, as set forth in claim 16, including:

a third trimming member fixedly connected to the frame at a location between the first and second trimming members; and a third control device having a tree trunk engaging portion and being movably connected to the third trimming member, said third control device being positionable to engage the tree trunk and establish a preselected transverse position of tree trunk relative to the third trimming member.

21. A method of trimming a tree with a harvesting head having a frame, a first trimming member pivotally connected to the frame and a first control device movably connected to the first trimming member, comprising the steps of:

positioning the frame of the harvesting head adjacent the tree trunk;

moving the first trimming member relative to the frame and transversely relative to the tree to a position at which a tree trunk engaging portion of the first control device is engaged with a trunk of the tree; and moving a one of the tree and harvesting head relative to an other of the tree and harvesting head and trimming the tree with the first trimming member.

22. A method, as set forth in claim 21, including the step of moving the tree trunk engaging portion of the first control device relative to the first trimming member to a preselected position and thereby defining a transverse position of the first trimming member relative to the tree.

23. A method, as set forth in claim 22, including a driving device connected to said frame and including the step of moving the driving device relative to the frame and longitudinally translating the tree trunk relative to the first trimming member.

24. A method, as set forth in claim 23, wherein said driving device including a pair of drive rollers movably connected to the frame and including the step of engaging the drive rollers with the tree trunk.

25. A method, as set forth in claim 21, including an actuator connected to said first trimming member and being movable to pivotally move the first trimming member relative to the frame, and including the steps of:

delivering pressurized fluid to said actuator; and maintaining the tree trunk engaging portion of said first control device in engagement with said tree trunk.

* * * * *